March 23, 1954     H. RICHTER     2,673,301

FLUID TIGHT STATOR, PARTICULARLY FOR ELECTRIC MOTORS

Filed Aug. 14, 1952

INVENTOR.

HANS RICHTER
BY
Howard G. Russell
his ATTORNEY

Patented Mar. 23, 1954

2,673,301

UNITED STATES PATENT OFFICE 2,673,301

FLUID TIGHT STATOR, PARTICULARLY FOR ELECTRIC MOTORS

Hans Richter, West Dulwich, London, England, assignor to Eustace S. Dunn, Piedmont, Calif.

Application August 14, 1952, Serial No. 304,403

3 Claims. (Cl. 310—86)

This invention relates to electric motors of the type in which the stator and windings are sealed for protection against the action of the fluid or the atmosphere in which the motor is operated. Motors of this type are used, for example, in submersible pumps which are, in effect, turbine pumps with a close-coupled electric motor, both pump and motor being immersed in the water, oil, or other fluid to be pumped.

In the construction of motors of the aforementioned type it is preferred practice to enclose the stator and the stator windings in a protective housing and to seal the bore of the stator within which the rotor is mounted, by means of a tubular lining sleeve so that fluid cannot enter the slots containing the windings.

The sleeve may be made of magnetic or nonmagnetic material of high tensile strength. Preferably it is made of a material of high electrical resistance to reduce eddy-current losses. Since the efficiency of the motor decreases with the thickness of the sleeve, it is naturally preferred to make the sleeve quite thin. In this connection limitations are imposed by the static pressure requiring a wall thickness sufficient not only to seal, but also to prevent deformation under the pressure encountered in the operation of the motor. Other limitations are imposed by the necessity of installing the sleeve without deformation or damage. In addition, it is necessary to provide a fit of the sleeve within the stator bore such that the sleeve will not turn under the influence of the rotating magnetic field. In view of the fact that vibrations are encountered which tend to lessen the friction between the sleeve and the bore in the stator, it has been preferred practice heretofore to press-fit the sleeve within the stator. Such press fit necessitates a wall thickness for the sleeve which is disadvantageous from an electrical standpoint.

The invention provides a sealing sleeve which is so thin as to cause no appreciable decrease in the efficiency of the motor, yet strong enough, due to its peculiar construction, to resist fluid pressure without deformation, and which is secure against rotation.

The sleeve may be considered to have portions of different thickness, greater thickness being provided within the area of the slots and less thickness being provided within the area of the pole tips along which the sleeve is in contact with the cylindrical surface of the stator bore.

The construction imparts extraordinary strength to the sleeve at the points where strength is most needed, that is within the area between the pole tips. Electrical losses are maintained low by the reduced thickness of the sleeve structure within the area of the pole tips where, in fact, no great thickness is needed since the sleeve is reinforced by the pole tips against which the sleeve bears.

Rotation is prevented by the aforementioned construction which effectively locks the sleeve between each two adjacent pole tips.

According to preferred practice, the sleeve is built up from a tubular center portion to which a plurality of reinforcing members or strips are secured.

The objects, features and advantages of this invention will appear more fully from the detailed description which follows accompanied by drawings showing, for the purpose of illustration, a preferred embodiment of this invention. The invention also consists in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figures 1, 2, 3:
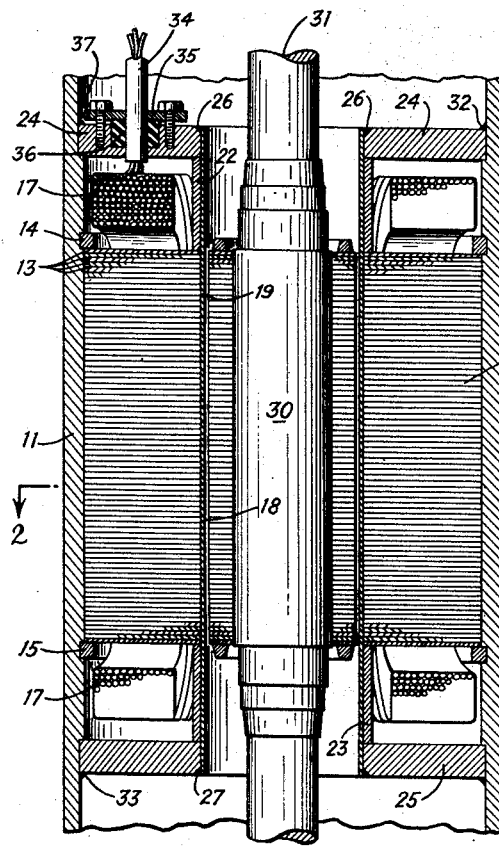
Fig. 1 is an elevational view showing, in section, the essential elements of a motor incorporating the invention, the section being taken on line I—I of Fig. 2.
Fig. 2 is a sectional plan view of the structure shown in Fig. 1, the section being taken on line 2—2 of Fig. 1.
Fig. 3 is a detailed view of a portion of Fig. 2 on an enlarged scale.

In the following description and in the claims, various details will be identified by specific names for convenience. These names, however, are intended to be as generic in their application as the art will permit. Corresponding reference characters refer to corresponding parts in the several figures of the drawings.

In the drawings accompanying, and forming part of, the specification, certain specific disclosure of the invention is made for the purpose of explanation of broader aspects of the invention, but it is understood that the details may be modified in various respects without departure from the principles of the invention and that the invention may be applied to other structures than the one shown.

Referring to Fig. 1, the motor 10 is enclosed in an outer pressure resistant shell 11 of steel, or preferably bronze. The stator 12 comprises a stack of stator laminations 13 assembled in a conventional manner and held in the outer shell by retaining rings 14 and 15.

The stator laminations are blanked out to provide radially extenting slots 16 for the stator windings 17. The stator laminations have a central bore 18 within which a lining sleeve 19 is fitted.

The sleeve 19 is preferably made of material having a relatively high electrical resistance to keep eddy-current losses low. Stainless steel is particularly suited as material for the sleeve and the sleeve is preferably made so thin that it would not, without reinforcement, sustain the normal pressures under which the motor operates.

The wall thickness of the sleeve is preferably made of a thickness of the order of between .005 to .01 of an inch.

The sleeve 19 is exteriorly supported by the bore of the stator, more particularly by the ends of the stator arms 20 which constitute pole tips 40. Each pole tip has a cylindrically curved end surface 41 and the cylindrical end surfaces of all the pole tips constitute the bore 18. The pole tips further have tapered side surfaces 42 and 43 which are inclined with respect to the remainder 44 and 45 of the side wall surfaces of the slots 16.

The sleeve 19 is reinforced by trough-shaped strips 46. These strips are of substantially V-shaped cross-section and are secured to the sleeve 19 along the vertex 47 of the V. This is conveniently accomplished by spot-welding, seam-welding or brazing. The arms of the V engage the tapered side surfaces 42 and 43 of the pole tips, thus securely anchoring the sleeve with respect to the stator.

The attached portion of the trough-shaped strip acts as reinforcement of the tubular portion of the sleeve and provides increased wall thickness. In addition, the trough-shaped strips add to the rigidity of the tubular portion, thereby strengthening the entire sleeve structure and facilitating assembly with the stack of stator laminations.

The sleeve structure is of increased thickness within the area of the slots but is of reduced thickness within the area of the pole tips where the tubular portion of the sleeve rests against the cylindrical end surfaces of the pole tips so that fluid pressure acting on the sleeve is in effect borne by the stator laminations. Beyond the stack of laminations the sleeve has external support by tubular reinforcing members 22 and 23. Annular end discs 24 and 25 support the ends of the sleeve structure and the tubular portion of the sleeve is soldered to the discs 24, 25 at 26 and 27.

The stator enclosure further comprises solder joints 32 and 33 between the end discs 24, 25 and the outer shell 11, respectively. Thus, the stator laminations are completely enclosed and are protected against the fluid within which the motor may be operated.

The windings 17 are locked in the slots by the usual fillers 21 which are driven into the slots to lock the windings securely. The fillers are so shaped as to leave space near the pole tips for the insertion of the trough-shaped portions 46 of the sleeve structure 19.

A rotor 30 is mounted concentric with the stator. The rotor may be of the conventional squirrel-cage type of construction and can be mounted with rather small clearance with respect to the sleeve structure 19 which, due to its reinforced construction remains cylindrical even under extreme pressures. The rotor shaft 31 is mounted in suitable bearings which are not shown for the reasons of simplicity.

A cable 34 extends into the stator space through a suitable seal or gland 35 of suitable construction. The details of the gland construction do not form part of this invention. For this reason, the cable entry is shown only in a simplified manner as comprising a rubber ring 36 compressed by a face plate 37, a preferred form of cable entry being disclosed in my co-pending application, Serial No. 304,401, filed August 14, 1952.

The assembly of the stator may proceed as follows:

The interior cylindrical periphery of the bore 18 of the stator laminations 13 is machined or ground to close tolerances after the windings 17 and fillers are installed. The assembly of the sleeve structure 19 may be facilitated by thermally expanding the stator and then inserting the sleeve structure into it. The thermal expansion of the stator may be accompanied by thermal contraction of the sleeve element 19 prior to assembly so as to provide a maximum amount of clearance between the parts during assembly. After the sleeve structure 19 is installed, the reinforcing tubular members 22 and 23 are slipped over the ends of the tubular portion of the sleeve, the end discs 24, 25 are installed and the solder joints are made. This completes the stator assembly.

Due to the thinness of the sleeve 19 at the pole tips, the motor efficiency is high and it is evident that the wall thickness of the tubular portion of the sleeve can be made quite low due to the aforedescribed support of the sleeve by the pole tips and the reinforcement of the sleeve proper by the strips which also anchor the sleeve structure against turning.

What is claimed is:

1. A sealed motor comprising a laminated stator body having a cylindrical bore and slots extending into the body from said bore the stator body between the slots constituting pole arms, opposite side walls of the slots converging towards each other at the ends to form pole tips on the arms, each pole tip having a cylindrically curved end surface and tapered side surfaces forming an angle with respect to the remainder of the respective side wall of the slots; and a tubular lining sleeve within said bore, said sleeve having trough-shaped strips on its outer periphery, said strips having a center portion substantially parallel to, in contact with, and attached to, the exterior surface of said sleeve, and two wing portions extending at an angle to said center portion, said wing portion resiliently engaging the side surfaces of said pole tips, thereby securing the sleeve to the stator body within said bore.

2. A sealed motor comprising a tubular outer shell, a laminated stator body within said shell, said body having a cylindrical bore and slots extending into the body from said bore, the stator body between the slots constituting pole arms, each pole arm having a pole tip at the end flared out with respect to, and wider than, the pole arm, the end surface of the pole tips having cylindrical curvature, the side surfaces of the pole tips being inclined with respect to the remainder of the respective side wall surfaces; a tubular lining sleeve within said bore; trough-shaped strips secured to the outer surface of said sleeve, said strips having a center portion substantially parallel to, in contact with, and attached to, the exterior surface of said sleeve, and two wing portions extending at an angle to said center portion, said wing portions resiliently engaging the side surfaces of said pole tips, said strips being shorter than said sleeve; a pair of annular discs secured to said outer shell and to said sleeve at either end of said stator; stator windings in said slots; reinforcing tubular members mounted on said sleeve between said discs and the ends of said strips, respectively; and a rotor mounted for rotation within said sleeve.

3. An inter or sealing sleeve for the stator of an electric motor, said sleeve comprising a tubular sleeve body and a plurality of trough-shaped strips of substantially the same thickness as the sleeve and of substantially V-shaped cross-section secured to the outer surface of said sleeve member at the vertex of the V.

HANS RICHTER.

References Cited in the file of this patent

UNITED STATES PATENTS

| Number | Name | Date |
| --- | --- | --- |
| 2,428,236 | Maxwell | Sept. 30, 1947 |